INVENTOR
H. A. HELM
BY R. O. Nimz
ATTORNEY

DIGITAL ERROR CORRECTING SYSTEMS

Filed Aug. 21, 1961 4 Sheets-Sheet 2

INVENTOR
H. A. HELM
BY
[signature]
ATTORNEY

Sept. 13, 1966 H. A. HELM 3,273,119

DIGITAL ERROR CORRECTING SYSTEMS

Filed Aug. 21, 1961 4 Sheets-Sheet 3

INVENTOR
H. A. HELM
BY R. O. Nimz
ATTORNEY

Sept. 13, 1966 H. A. HELM 3,273,119

DIGITAL ERROR CORRECTING SYSTEMS

Filed Aug. 21, 1961 4 Sheets-Sheet 4

INVENTOR
H. A. HELM
BY R. O. Nimtz
ATTORNEY

United States Patent Office 3,273,119
Patented Sept. 13, 1966

3,273,119
DIGITAL ERROR CORRECTING SYSTEMS

Harry A. Helm, Morristown, N.J., assignor to Bell Telephone Laboratories, Incorporated, New York, N.Y., a corporation of New York Filed Aug. 21, 1961, Ser. No. 132,925
24 Claims. (Cl. 340—146.1)

This invention relates to data processing systems and, more particularly, to digital error detecting and error correcting circuits for such systems.

When digital signals are transferred from one place to another, errors in the signals occasionally arise due to the noise present in the transferring mechanism. Transmission over long transmission channels, for example, normally causes errors in the received signal which are dependent on the quality of the transmission channel used. Similarly, reading a stored signal from a storage mechanism such as a magnetic tape or punched card always involves some probability, however small, of erroneous outputs. In many signaling systems, the information transmitted is of such a nature that occasional errors cause no harm. Voice signals, for example, carrying human speech, include large amounts of redundancy inherent in human languages and can be intelligibly received even in the presence of relatively large amounts of error.

Many signals, however, do not include any natural redundancy and hence redundancy must be added to detect and/or correct errors in the signal. Various coding schemes employing so-called "parity check" digits to detect and/or correct errors in individual digits are disclosed in R. W. Hamming et al. Reissue Patent 23,601, granted December 23, 1952, E. P. G. Wright Patent 2,653,996, granted September 29, 1953, and D. W. Hagelbarger Patent 2,956,124, granted October 11, 1960. These schemes vary as to the amount of redundancy added, the number of errors corrected or detected, and the placement of the checking information with respect to the message. All of the schemes heretofore proposed, however, are complex and expensive, particularly where more than single errors are to be corrected. Moreover, these schemes are limited to correcting only small classes of errors such as single errors in each message block, multiple errors which are adjacent, or errors separated by minimum or maximum digit positions.

The object of the present invention is to correct and/or detect all classes of errors of any desired number with simple, economical, and easily modified circuitry.

A more specific object of the invention is to correct errors in word-length blocks of digits regardless of the number or type of digit-errors.

A related object of the invention is to detect multiple errors in a block of information, thereby to prevent utilization of erroneous information blocks.

In accordance with the present invention, check characters are generated which reflect the character-by-character "parity" of a block of information characters. These check characters are generated with linear sequential networks which perform arithmetic operations on the information characters. Recalculation of the check characters at the receiver and comparison with the transmitted check character indicates the presence or absence of errors in the block of information signals. Moreover, inverse operations on the error signal (the difference between transmitted and recalculated check characters) are arranged to generate the amount of the error in exact synchronism with the outpulsing of the information characters such that the erroneous character can be corrected with no loss of time.

One advantage of the present invention is the speed with which error detection and correction can be made. Continuous processing of incoming information is possible with the only delay between input and output being the length of a single block of information.

A feature of the invention is the ease with which a basic single error correcting circuit block can be duplicated an arbitrary number of times to correct an arbitrary number of errors, either by interleaving message blocks or by serially connecting correction blocks.

These and other objects and features, the nature of the present invention and its various advantages, will be more readily understood upon consideration of the attached drawings and the following detailed description of the drawings.

Figure 1:
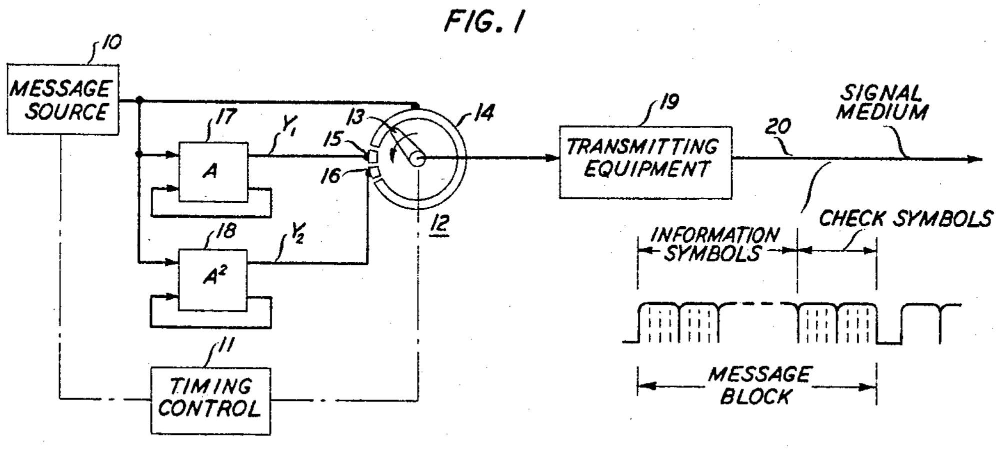
FIG. 1 is a schematic block diagram of an error correcting check character generator according to the present invention.

Referring more particularly to FIG. 1, there is shown a schematic block diagram of the transmitter portion of an error correcting pulse transmission system in accordance with the present invention. The circuit of FIG. 1 comprises a message source 10 which may comprise, for example, a magnetic or punched tape, an encoder for analog signals, or the output stages of a computing system. Indeed, source 10 may comprise any digital information source in which the information is represented by binary code groups of fixed length (words or characters) which can be assembled into blocks of words of desired lengths (message blocks). Timing control circuit 11 is provided to time the output pulses from source 10 and to divide the code words into equal length message blocks with a guard space of at least two code word lengths between adjacent message blocks.

Timing control circuit 11 also drives a collecting commutator 12 having a brush 13 which successively sweeps across a large segment 14 and two small segments 15 and 16. The output of message source 10 is applied to segment 14 of commutator 12 and also to two linear sequential networks 17 and 18. Linear sequential networks 17 and 18 are special forms of iterative networks including only storage elements, gates and modulo-2 adding networks. These types of networks are discussed in detail in an article by B. Elspas entitled "The Theory of Autonomous Linear Sequential Networks" appearing at pages 45 through 60 of the IRE Transactions on Circuit Theory, volume CT-6, Number 1, March 1959. These networks will be discussed in more detail hereafter.

The output of sequential network 17 is applied to segment 15 on commutator 12 while the output of sequential network 18 is applied to segment 16. It can be seen that, as brush 13 of commutator 12 rotates in a counterclockwise direction, it picks up information signals from large segment 14 which are followed by a signal from segment 15 and then a signal from segment 16. Timing control circuit 11 so controls commutator 12 that the signals from segments 15 and 16 fall in the guard spaces between successive blocks of information from source 10.

It is to be understood that commutator 12 has been illustrated as a mechanical commutator only for the purposes of clarity and would in most cases actually comprise an electronic commutator of any of the forms well known in the art. Furthermore, each of the interconnections between the blocks in FIG. 1 has been illustrated as a single line for simplicity. It is to be understood that source 10 may provide pulse code groups in serial form on a single lead, or in parallel form on a plurality of leads.

Brush 13 of comutator 12 is connected to a transmitter 19 which prepares the pulse signal for transmission to a signal medium 20. Transmitter 19 may include modulators, amplifiers, multiplexing equipment, or any other facilities necessary to prepare the signals for medium 20. Similarly, medium 20 may comprise a transmission medium such as a telephone line, a high frequency coaxial or other wave guiding medium, or even a radio link without any physical interconnection. Medium 20 may not even be a transmission link, but may be a storage medium such as a magnetic tape or drum.

It is to be noted that the information supplied by source 10 can be in any binary code such as the ordinary binary code, the Gray code or any other cyclic, noncyclic or redundant code. Linear sequential networks 17 and 18 operate upon the code groups of each message block to form two check symbols identified in FIG. 1 as $Y_1$ and $Y_2$. These check symbols are computed so as to allow the correction of any single code-group error in the message block and are added to the end of the message block by means of commutator 12. The waveform in FIG. 1 illustrates one form of an entire message block in serial form, including message symbols and error correction check symbols.

Before proceeding to the description of the receiving portion of the present invention, it is well to note some aspects of the over-all operation of the circuit.

It should be first noted that the present invention permits the correction of entire words or symbols comprising a plurality of "digits" or "bits" and is not limited to the correction of single bits. Hence the two check symbols can correct multiple bit errors if they occur in the same word or multidigit symbol.

Secondly, it should be noted that the error correction scheme of the present invention is of the so-called logical or arithmetic type, and permits the detection as well as the correction of errors. That is, the system of the present invention serves to detect multiple errors exceeding the correction capacity of the system. Thus the system of FIGS. 1 and 2 can correct single character errors in each message block and can detect all double errors and most multiple errors exceeding two.

A measure of the efficiency of the present scheme can be had by noting the amount of redundancy required for error correction.

In an $m$-digit binary code, ($2^m$) different unique code combinations can be formed. Since the all zeros code (000 . . . 0) presents an ambiguous indication to the circuitry to be described, this code is not used and hence ($2^m-1$) unique code combinations are available for use.

The present invention permits the correction of single errors in a block of up to ($2^m-1$) $m$-digit information symbols by means of two $m$-digit correction symbols. The transmission rate R which measures the redundancy of the system and hence the efficiency of the error correcting scheme, is given by the ratio of the number of information symbols transmitted to the total number of symbols transmitted, both information symbols and error correction symbols. With the present system $$R=\frac{2^m-1}{2^m+1}. \quad (1)$$

For a four digit code ($m=4$), for example, $R=.88$, for $m=5$, $R=.94$, for $m=6$, $R=.97$, et cetera. It will be noted that as $m$ is increased, R approaches unity, that is, one hundred per cent efficiency. It will also be noted, however, that the length of the message block, and hence the probability of errors in the message block, increases exponentially with $m$. Hence the chance of more than a single error in a block also increases. The choice of actual block length, and hence efficiency, will therefore depend on the nature of the medium 20 and the probability distribution of errors. However, successive blocks of information need not have the same number of symbols since the entire operation is arithmetic and depends only on the symbols associated within each block. If the blocks are of unequal lengths, it may be desirable to include with each block an indication of block length to save unnecessary (although not harmful) iterative steps at the error correcting apparatus.

In order to better understand the present invention, the following mathematical discussion is helpful. If the information symbols are represented by $$X_1, X_2, X_3, \ldots, X_{(p^m-1)} \quad (2)$$

then the operation of linear sequential networks 17 and 18 can be characterized, respectively, by $$Y_1=\sum_{i=1}^{p^m-1}(A)^{(i-1)}X_i$$

and $$Y_2=\sum_{i=1}^{p^m-1}(A^2)^{(i-1)}X_i. \quad (3)$$

Writing out the right-hand sides of Equations (3) gives $$Y_1=X_1+AX_2+A^2X_3+\ldots+A^{p^m-2}X_{(p^m-1)}$$
$$Y_2=X_1+A^2X_2+A^4X_3+\ldots+A^{(2p^m-4)}X_{(p^m-1)} \quad (4)$$

In Equations 3 and 4, the term A represents the linear sequential operation performed by the network 17 and $A^2$ the operation performed by network 18. The operation A can be any arithmetic operation which has mathematical significance with respect to the allowed code words. One such operation can, in general, be defined as that operation which translates each code word in the code representation used into a unique one other code word. Thus it can be seen that this operation A relates all of the possible code words in a closed loop sequence in which none of the code words are missing and in which each code word can be obtained by performing the operation A on the preceding code word. The operation $A^2$ then corresponds to repeating the operation A twice in succession and hence $A^2$ relates every other code word in the aforementioned closed loop sequence. Such closed loop sequences of code words are described in an article by R. C. Bose and D. K. Roy-Chaudhuri entitled "On a Class of Error Correcting Binary Group Codes" appearing at pages 68 through 79 of Information and Control, volume 3, Number 1, March 1960, and have been called "Bose-Chaudhuri codes."

In the error correcting system of the present invention, each code word is treated as a number and the operation A is a mathematical transform relating all of the numbers of the code in a unique closed loop sequence. In the theory of linear sequential networks described in the above-noted article by Elspas, A is a nonsingular T-matrix representation of a linear sequential network having maximum cycle length (including all of the ($2^m-1$) non-zero elements of the Galois Field GF ($2^m$)). As noted in the Elspas article any nonsingular T-matrix A has a unique inverse matrix $A^{-1}$ relating each element to a unique predecessor. Moreover, the characteristic polynomial of a nonsingular matrix A defining a maximal-cycle network must be an irreducible prime factor of ($x^{2^m}-x$).

Returning to the circuit of FIG. 1, linear sequential networks 17 and 18 are arranged to generate the check symbols $Y_1$ and $Y_2$ according to the iteration Formulae 3 or 4. Specific examples of these types of networks will be given below along with the manner in which they are obtained from the T-matrix and the irreducible polynomials.

Figure 2:
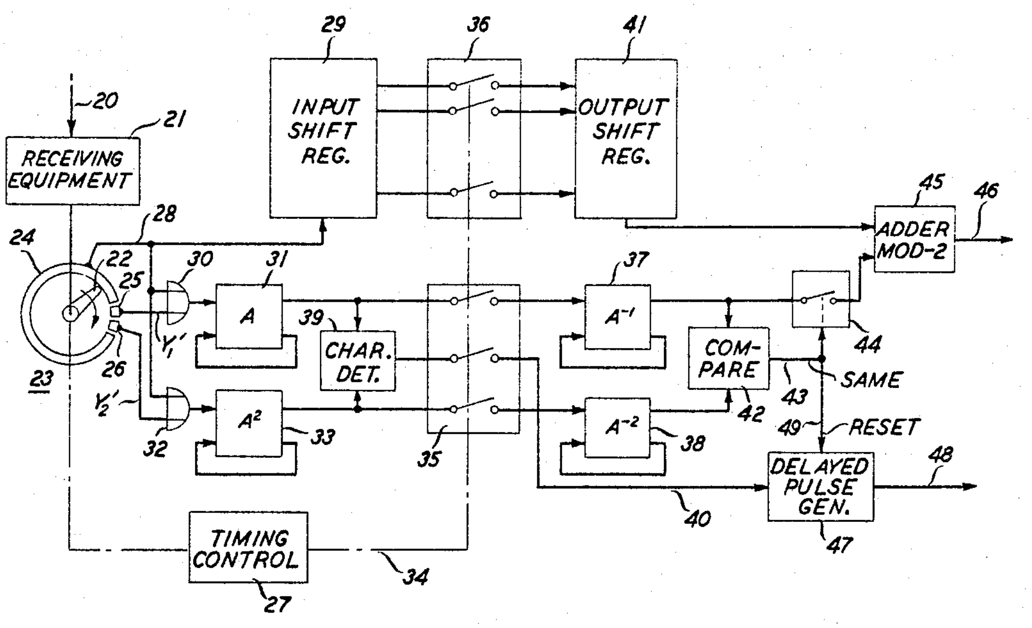
FIG. 2 is a corresponding schematic block diagram of an error correcting circuit in accordance with the invention.

In FIG. 2 there is shown a schematic block diagram of the receiving or error detecting and error correcting portion of the system of the present invention. The diagram of FIG. 2 comprises receiving equipment 21 to which signals from medium 20 are applied for demodulation, amplification, or any other process required to place them in their original pulse form.

The output of receiving equipment 21 is applied to the brush 22 of distributing commutator 23. Commutator 23 has one large segment 24 and two small segments 25 and 26. Brush 22, rotating in a clockwise direction, successively contacts segments 24, 25 and 26, returning then to segment 24. Commutator 23 is controlled by timing control circuit 27 so as to rotate in synchronism with commutator 12 in FIG. 1. Any well-known technique for synchronizing commutators 12 and 23, such as a synchronization recovery circuit or a separate timing wave supplied to timing control circuits 11 and 27, neither of which are shown, serves to maintain this synchronism such that brush 22 contacts segment 25 when the error correcting symbol $Y_1'$ arrives from receiver 21 and contacts segment 26 when the symbol $Y_2'$ arrives from receiver 21.

The message symbols are delivered from segment 24 via link 28 to an input shift register 29 having a sufficient number of stages of storage to store an entire message block. The message symbols are also delivered via link 28 and logical OR gate 30 to a linear sequential network 31 which may be identical to network 17 in FIG. 1. The message symbols are likewise delivered via OR gate 32 to linear sequential network 33 which may be identical to network 18 in FIG. 1. OR gates 30 and 32 are logical gates of the well-known type wherein an output is produced when either or both inputs are energized. Since such gates are well-known, they will not be further described here except to state that they can be realized with extremely simple arrangements of diodes, transistors or vacuum tubes.

It can be seen that, with the arrangement of FIG. 2, the check symbols are recalculated from the received message symbols by means of networks 31 and 33. The received check symbols $Y_1'$ and $Y_2'$ are delivered via segment 25 and OR gate 30 to network 31, and via segment 26 and OR gate 32 to network 33, respectively. The received check symbols are added (modulo-2) to the recomputed check symbols so as to produce an indication of error. This can be seen quite easily from the following considerations.

It is readily apparent that, if no errors whatever have occurred in transmission on medium 20, the recomputed check symbols derived by networks 31 and 33 will equal the transmitted check symbols. Hence the modulo-2 sum of the recomputed check symbols and the transmitted check symbols will produce a zero output from networks 31 and 33 after all these additions are complete.

Timing control circuit 27 includes a pulse divider which causes a pulse to appear on lead 34 once for each revolution of brush 22 in the time slot immediately following the point when brush 22 leaves segment 26. The pulse on lead 34 operates gates 35 and 36. Gate 35 connects the outputs of networks 31 and 33 to networks 37 and 38, respectively, and connects the output of character detector 39 to error indicating lead 40. Since the inputs of character detector 39 are connected to the outputs of networks 31 and 33, a signal on lead 40 indicates that neither of these outputs are zero and hence an error has occurred.

Assuming that the received message symbols are given by $$X_1', X_2', X_3', \ldots, X_i', \ldots X_{(p^m-1)} \qquad (5)$$

and that an error has occurred in the ith symbol, the received message is represented by $$X_1, X_2, X_3, \ldots X_i+N, \ldots X_{p^m-1} \qquad (6)$$

where N is the amount of the error. The recomputed error correcting symbols $\overline{Y}_1$ and $\overline{Y}_2$ are given by $$\overline{Y}_1=X_1+AX_2+A^2X_3+\ldots+A^{(i-1)}X_i+A^{(i-1)}N+\ldots+A^{(p^m-2)}X_{(p^m-1)}$$

$$\overline{Y}_2=X_1+A^2X_2+A^4X_3+\ldots+A^{(2i-2)}X_i+A^{(2i-2)}N+\ldots+A^{(2p^m-4)}X_{(p^m-1)}$$

Adding (modulo-2) the received check symbols $Y_1'$ and $Y_2'$ to $\overline{Y}_1$ and $\overline{Y}_2$, respectively, assuming that no error occurs in these check symbols ($Y_1'=Y_1$; $Y_2'=Y_2$), the error is given by combining Equations 4 and 7:

$$E_1=\overline{Y}_1+Y_1'=\overline{Y}_1+Y_1=A^{(i-1)}N$$
$$E_2=\overline{Y}_2+Y_2'=\overline{Y}_2+Y_2=A^{(2i-2)}N \qquad (8)$$

Equations 8 give not only the amount of the error (N) but also the location of the error, since the information symbol identified by the two powers of A are unique. All that remains is to correct the proper information symbol by the amount of the error.

In accordance with the present invention, the information symbols serially shifted into input shift register 29 are transferred in parallel by means of gate 36 to output shift register 41, also having a storage capacity equal to the number of bits in the block of information symbols. Simultaneously, the outputs of networks 31 and 33 are gated by gate 35 to networks 37 and 38. Network 37 is a linear sequential network which per forms the inverse of the operation of network 31 in FIG. 2 and network 17 in FIG. 1, and is labeled $A^{-1}$. Network 38 is also a linear sequential network which performs the inverse of the operation of network 33 in FIG. 2 and network 18 in FIG. 1, and is labeled $A^{-2}$.

Utilizing the error components of Equations 8 as the input to networks 37 and 38, respectively, the outputs Z of networks 37 and 38 as the operations $A^{-1}$ and $A^{-2}$ are iterated can be seen to be $$Z_1(n+1)=A^{-1}Z_1(n)$$
$$Z_2(n+1)=A^{-2}Z_2(n)$$

or more specifically

| | | |
|---|---|---|
| (a) | $Z_1(1)E_1=A^{(i-1)}N$ | $Z_2(1)=E_2=A^{(2i-2)}N$ |
| (b) | $Z_1(2)=A^{-1}Z(1)=A^{i-2}N$ | $Z_2(2)=A^{-2}Z_2(1)=A^{2i-4}N$ |
| (c) | $Z_1(3)=A^{-1}Z(2)=A^{i-3}N$ | $Z_2(3)=A^{-2}Z_2(2)=A^{2i-6}N$ |
| (d) | $Z_1(i-1)=A^{-1}Z_1(i-2)=AN$ | $Z_2(i-1)=A^{-2}Z_2(i-2)=A^2N$ |
| (e) | $Z_1(i)=A^{-1}Z_1(i-1)=N$ | $Z_2(i)=A^{-2}Z_2(i-1)=N$ |
| (f) | $Z_1(i+1)=A^{-1}Z_1(i)=A^{-1}N$ | $Z_2(i+1)=A^{-2}Z_2(i)=A^{-2}N$ |
| (g) | $Z_1(p^m-1)=A^{i-1}Z_1(p^m-2)=A^{(i-p^m+1)}N$ | $Z_2(p^m-1)=A^{-2}Z_2(p^m-2)=A^{(2i-2p^m+2)}N$ |

It can be seen that the outputs of networks 37 and 38 are equal only on the ith iteration shown by Equations e above. A compare or coincidence circuit 42 indicates this equality by means of a digit-by-digit comparison and produces an output on lead 43 when this equality occurs.

If the message symbols are stepped out of output shift register 41 in synchronism with the iteration operations performed in networks 37 and 38, the output of compare circuit 42 on lead 43 can be used to operate gate 44 which connects the output of network 37 to adding circuit 45. The output of network 37 at this time is equal to the amount of the error N and occurs in synchronism with the stepping of the erroneous symbol from register 41. Adder circuit 45 adds the amount of the error to the erroneous symbol and produces a corrected output on lead 46. It will be noted that the order of the information symbols is reversed in outpulsing from register 41 since the inverse operations generate correction symbols in reverse of the sequence in which check symbols are generated.

The gated output of character detector 39, appearing on lead 40, is applied to a delayed pulse generator 47 which serves to produce an output on lead 48 a fixed time after the application of a pulse to its input by way of lead 40. Delayed pulse generator 47 has a third input 49 to which the output of compare circuit 42 is applied. A pulse applied to generator 47 at input 49 resets the delayed pulse generator so that no output will appear at lead 48 unless and until a new pulse is applied to lead 40.

Delayed pulse generator 47 may take any one of the many forms used in the art. For example, generator 47 may advantageously comprise a so-called one-shot or monostable multivibrator which is normally in its quiescent state but is triggered to an unstable state by the application of a pulse to input lead 40. A timing circuit controls the return of the monostable multivibrator to its quiescent state at which time it produces an output on lead 48. A pulse on a control lead 49, however, immediately returns the monostable multivibrator to its quiescent state and, at the same time, suppresses the output on lead 48.

The delay time of delayed pulse generator 47 is adjusted to slightly exceed the length of time required to transmit an entire block of information and check symbols. With this arrangement it can be seen that delayed pulse generator is triggered by a pulse on lead 40 each time an error is detected in a received message block. If the error is corrected, a pulse on lead 49 resets generator 47 without producing an output. If more than a single error has occurred in the message block, however, the outputs of networks 37 and 38 will never match, no output will be produced on lead 43, generator 47 will not be reset, and a pulse will appear on lead 48 immediately following the block of information symbols containing the multiple errors. The signal on lead 48 can be used to instruct utilization equipment connected to lead 46 to disregard the previous information block as erroneous, or can be used in accordance with well-known techniques to instruct the equipment of FIG. 1 to retransmit the information block including the multiple errors. Thus the system of FIGS. 1 and 2 not only corrects single errors, but also detects all double errors and most multiple errors exceeding two. (The system fails to detect multiple errors only when these errors are such that they exactly compensate for each other and result in zero outputs from both of networks 31 and 33 after complete iteration.)

It will be noted that the circuit of FIG. 2 operates continually to process data received on medium 20 with a fixed delay equal to the length of one message block. That is, while a previously received message block is being read out of output register 41 and corrected, the next message block can be read into input register 29, the only time lost being that required to transmit the two check symbols. It is to be further noted that each of linear sequential networks 17 and 18 in FIG. 1 and 31, 33, 37 and 38 in FIG. 2 must be cleared after the processing of each message block. A clearing pulse can be easily generated by timing control circuits 11 and 27 following each message block to achieve this purpose. The output of timing control circuit 27 appearing on lead 34, for example, could be delayed for a fractional pulse period and applied to clear networks 31 and 33.

It can be seen that the effect of an error in one of the check symbols with the system of the present invention does not prevent the operation of the system. If one of the check symbols is in error, the output of one of networks 31 and 33 will be the amount of the error, and the other will be zero. Character detector 39 will therefore not be fully energized and no pulse will appear on lead 40. The information symbols will be stepped out of output register 41 as before. The outputs of networks 37 and 38 will never match, however, and no correction will take place.

It can therefore be seen that the system of the present invention associates with each block of $(2^m-1)$ information symbols, two check symbols which can be used to correct any single errors occurring in the information signals block and further serve to detect any multiple errors in the block. The only disadvantage of the arrangement is that if *both* check symbols are in error, the system will indicate multiple errors in the block even though all of the information symbols are correct. This is a small disadvantage, however, in view of the extreme unlikelihood of such a combination of errors. Furthermore, the system fails safe even under this worst condition in that an uncorrected error output on lead 48 will require disregarding or retransmitting the block.

To reiterate, the major advantage of the present invention over heretofore proposed systems is:

(1) The ability to correct entire multidigit symbols regardless of the number of errors in the symbol. This becomes important for systems in which errors are likely to occur in bursts covering a plurality of successive digits.

(2) The ability to correct errors in the same amount of time required to transmit the information and check symbols. This permits continuous processing.

(3) The ability to detect all double and most multiple errors, exceeding two, no matter how many, and even if they occur in the check symbols themselves. The system therefore can, at worst, only fail safe even when *both* check symbols are in error.

Most of the circuit elements of FIGS. 1 and 2 are well-known and will not be further described. The linear sequential networks, however, are not well-known and hence will be described in detail below.

As noted above, the linear sequential networks of the present invention can be represented by T-matrices which, in turn, are derived from irreducible prime polynomial factors of $(x^{2m}-x)$. Since obtaining these prime polynomials is a rather laborious process, certain of these polynominals have been listed in the following table along with the corresponding A's in matrix form:

| m | Irreducible Polynomials | A |
|---|---|---|
| 3 | $x^3+x+1=0$ | $\begin{bmatrix}0&0&1\\1&0&1\\0&1&0\end{bmatrix}$ |
| 4 | $x^4+x+1=0$ | $\begin{bmatrix}0&0&0&1\\1&0&0&1\\0&1&0&0\\0&0&1&0\end{bmatrix}$ |
| 5 | $x^5+x^2+1=0$ | $\begin{bmatrix}0&0&0&0&1\\1&0&0&0&0\\0&1&0&0&1\\0&0&1&0&0\\0&0&0&1&0\end{bmatrix}$ |

It is to be understood that the above table lists only one possible irreducible prime factor of $$(x3^{m}-x)$$

which gives maximal cycle length. Other polynomial factors will also give maximal cycle length although they may produce a somewhat more complex form for the operator A. Irreducible polynomials for higher values of $m$ can be found in an article by R. W. Marsh entitled "Tables of Irreducible Polynomials over GF(2) Through Degree 19," National Security Agency, October 24, 1957.

The manner in which the matrices A are derived from the irreducible polynomials can be shown as follows. The irreducible polynomial always takes the form $$a_0+a_1x+a_2x^2+\ .\ .\ .\ +a_{m-1}x^{(m-1)}+x^m \qquad (9)$$

which can be written as $$x^m=a_0+a_1x+a_2x^2+\ .\ .\ .\ +a_{m-1}x^{(m-1)} \qquad (10)$$

using the modulo-2 relation $+1=-1$.

Any binary number X can be represented as one element of the $2^m$ elements in the Galois Field GF ($2^m$) by means of a polynomial of the form $$X=b_0+b_1x+b_2x^2+\ .\ .\ .\ +b_{m-1}x^{(m-1)} \qquad (11)$$

where the $b$'s may be thought of as the components of a vector in the Galois Field. The $b$'s have values of "1" or "0" and represent the binary number itself, $b_0$ being the least significant digit.

The binary number represented by the Equation 11 can be transformed into another binary number X' which is also an element of the field by multiplication by $x$. This element is, in fact, the next element in the closed loop sequence formed by all of the elements. This multiplication gives $$X'=b_0x+b_1x^2+b_2x^3+\ .\ .\ .\ +b_{m-2}x^{(m-1)}+b_{m-1}x^m \qquad (12)$$

Using the relationship of Equation 10, there is obtained $$X'=b_0x+b_1x^2+b_2x^3+\ .\ .\ .\ +b_{m-2}x^{m-1}+b_{m-1}a_0+b_{m-1}a_1x+b_{m-1}a_2x^2+\ .\ .\ .\ +b_{m-1}a_{m-1}x^{m-1} \qquad (13)$$

Collecting terms $$X'=(b_{m-1}a_0+b_0+b_{m-1}a_1)x+(b_1+b_{m-1}a_2)x^2+(b_2+b_{m-1}a_3)x^3+\ .\ .\ .\ +(b_{m-2}+b_{m-1}a_{m-1})x^{m-1} \qquad (14)$$

It can be seen that the parenthetical expressions form the coefficients of a new polynomial $$X'=b_0'=b_1'x+b_2'x^2+b_3'x^3+\ .\ .\ .\ +b'_{m-1}x^{m-1} \qquad (15)$$

where the new coefficients are given by $$\begin{aligned} b_0'&=b_{m-1}a_0\\ b_1'&=b_0+b_{m-1}a_1\\ b_2'&=b_1+b_{m-1}a_2\\ b_3'&=b_2+b_{m-1}a_3\\ &\ \vdots\\ b_{m-1}'&=b_{m-2}+b_{m-1}a_{m-1} \end{aligned} \qquad (16)$$

The coefficient relation in Equations 16 can be easily expressed in matrix form as $$\begin{bmatrix} b_0'\\ b_1'\\ b_2'\\ \cdot\\ \cdot\\ b'_{m-1} \end{bmatrix} = \begin{bmatrix} 0 & 0 & 0 & - - - - - - - - - & 0 & a_0\\ 1 & 0 & 0 & - - - - - - - - - & 0 & a_1\\ 0 & 1 & 0 & - - - - - - - - - & 0 & a_2\\ \cdot & \cdot & \cdot & & \cdot & \cdot\\ \cdot & \cdot & \cdot & & \cdot & \cdot\\ 0 & 0 & 0 & - - - - - - - - - & 1 & a_{m-1} \end{bmatrix} \begin{bmatrix} b_0\\ b_1\\ b_2\\ \cdot\\ \cdot\\ b_{m-1} \end{bmatrix} \qquad (17)$$

Since the center matrix given in Expression 17 transforms $X$ into $X'$, it corresponds to the desired operation A, that is, $$X'=AX \qquad (18)$$

This is just the operation desired for the linear sequential networks 17 and 31 in FIGURES 1 and 2.

The matrix representations of the remaining operations can easily be derived from the basic matrix according to well known relationships.

$$\begin{aligned} A^2&=[A]\,[A]\\ A^{-1}&=\frac{\hat{A}}{|A|}=\hat{A}\\ A^{-2}&=[A^{-1}]\,[A^{-1}] \end{aligned} \qquad (19)$$

where $|A|$ is the determinant of A and equals one for non-singular binary matrices, and $\hat{A}$ is the adjoint matrix. Using Relationships 19, the general forms for $A^2$, $A^{-1}$ and $A^{-2}$ in terms of the coefficients of the irreducible polynomial can be easily derived as:

$$A^2=\begin{bmatrix} 0 & 0 & 0 & 0 & - - - - - - & 0 & a_0 & (a_0a_{m-1})\\ 0 & 0 & 0 & 0 & - - - - - - & 0 & a_1 & (a_0+a_1a_{m-1})\\ 1 & 0 & 0 & 0 & - - - - - - & 0 & a_2 & (a_1+a_2a_{m-1})\\ 0 & 1 & 0 & 0 & - - - - - - & 0 & a_3 & (a_2+a_3a_{m-1})\\ \cdot & \cdot & \cdot & \cdot & & \cdot & \cdot & \cdot\\ \cdot & \cdot & \cdot & \cdot & & \cdot & \cdot & \cdot\\ 0 & 0 & 0 & 0 & - - - - - - & 0 & a_{m-2} & (a_{m-3}+a_{m-2}a_{m-1})\\ 0 & 0 & 0 & 0 & - - - - - - & 1 & a_{m-1} & (a_{m-2}+a_{m-1}a_{m-1}) \end{bmatrix}$$

$$A_{-1}=\begin{bmatrix} a_1 & 1 & 0 & 0 & - - - & 0 & 0\\ a_2 & 0 & 1 & 0 & - - - & 0 & 0\\ a_3 & 0 & 0 & 1 & - - - & 0 & 0\\ \cdot & \cdot & \cdot & \cdot & & \cdot & \cdot\\ \cdot & \cdot & \cdot & \cdot & & \cdot & \cdot\\ a_{m-1} & 0 & 0 & 0 & - - - & 0 & 1\\ a_0 & 0 & 0 & 0 & - - - & 0 & 0 \end{bmatrix}$$

$$A^{-2}=\begin{bmatrix} (a_1+a_2) & a_1 & 1 & 0 & - - - - - & 0 & 0 & 0\\ (a_1a_2+a_3) & a_2 & 0 & 1 & - - - - - & 0 & 0 & 0\\ (a_1a_3+a_4) & a_3 & 0 & 0 & - - - - - & 0 & 0 & 0\\ \cdot & \cdot & \cdot & \cdot & & \cdot & \cdot & \cdot\\ \cdot & \cdot & \cdot & \cdot & & \cdot & \cdot & \cdot\\ (a_1a_{m-3}+a_{m-2}) & a_{m-3} & 0 & 0 & - - - - - & 0 & 1 & 0\\ (a_1a_{m-2}+a_{m-1}) & a_{m-2} & 0 & 0 & - - - - - & 0 & 0 & 1\\ (a_1a_{m-1}+a_0) & a_{m-1} & 0 & 0 & - - - - - & 0 & 0 & 0\\ (a_1a_0) & a_0 & 0 & 0 & - - - - - & 0 & 0 & 0 \end{bmatrix}$$

It can be seen that the matrix representation of A given in Expression 17 is a matrix with all all-zero entries except the last column which takes the values of the coefficients of the irreducible polynomial, and the first diagonal below the principle diagonal which is all ones. These matrices can therefore be formed with ease from the irreducible polynomials given in the above table and in the Marsh reference. The matrices for $A^2$, $A^{-1}$ and $A^{-2}$ can be formed as easily by similar methods, noting that all arithmetic operations are modulo-2.

A specific example will now be described to further illustrate the procedure for forming the linear sequential networks required for the present invention. Assuming that $m$ has a value of four, the irreducible polynomial is $$x^4+x+1=0$$

and A is given by $$\begin{bmatrix} 0 & 0 & 0 & 1\\ 1 & 0 & 0 & 1\\ 0 & 1 & 0 & 0\\ 0 & 0 & 1 & 0 \end{bmatrix}$$

Writing out the specific coefficient relationships, in the iterative process, where the X's are the input digits to the linear sequential network and the Y's are the output digits gives $$\begin{aligned} y_1(n+1)&=y_4(n)+x_1(n+1)\\ y_2(n+1)&=y_1(n)+y_4(n)+x_2(n+1)\\ y_3(n+1)&=y_2(n)+x_3(n+1)\\ y_4(n+1)&=y_3(n)+x_4(n+1) \end{aligned} \qquad (20)$$

Equations 20 are equivalent to the iterative process.

$$Y(n+1)=AY(n)+X(n+1) \qquad (21)$$

which generates the desired check symbols.

Figure 3A:
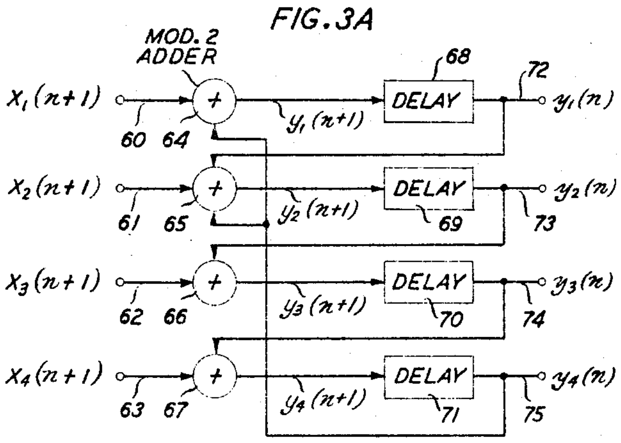
FIGS. 3A and 3B are alternative arrangements for certain portions of FIGS. 1 and 2 for parallel information processing.

Turning to FIG. 3A of the drawings, there is shown a specific circuit diagram of a network suitable for performing the iteration of Equations 20 and 21. The circuit of FIG. 3A assumes that $m=4$ and that the information digits for each symbol are available simultaneously on four parallel leads 60, 61, 62 and 63. Input leads 60, 61, 62 and 63 are connected to respective inputs of modulo-2 adder circuits 64, 65, 66 and 67 which have their outputs connected to respective inputs of one-bit delay lines 68, 69, 70 and 71. The outputs of delay lines 68, 69, 70 and 71 are connected to leads 72, 73, 74 and 75, respectively, and comprise the outputs of the network.

Figure 4A:
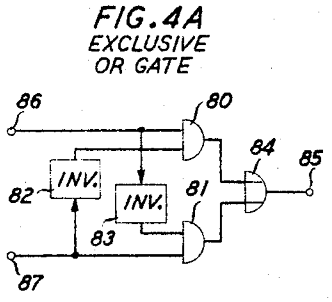
FIGS. 4A and 4B are modulo-2 adder circuits useful in certain portions of the circuits of FIGS. 3A and 3B.

Each of adder circuits 64 through 67 can comprise one or a plurality of so-called exclusive OR circuits which produces an output if one, and only one, of its inputs is energized. Such logical circuits are well known in the art, forming a basic element of most binary adders. One such circuit is illustrated in FIG. 4A and comprises a pair of AND gates, 80 and 81, a pair of inverters 82 and 83 and an OR gate 84. It can easily be seen that an output is produced at terminal 85 if one, and only one, of inputs 86 and 87 is energized.

Figure 4B:
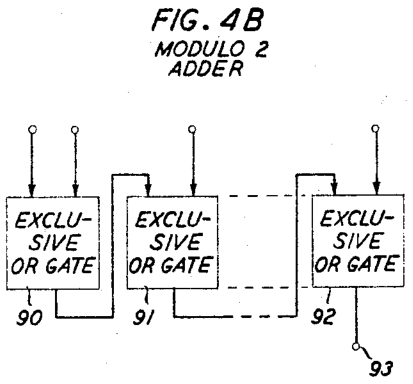

If more than two inputs are required for a modulo-2 adder, the network of FIG. 4B can be used. It comprises a plurality of exclusive-OR gates 90, 91, . . . 92, each of which may be identical to FIG. 4A. The first two inputs are applied to exclusive-OR gate 90. The output of gate 90 and the third input are applied to gate 91, and so forth, to the last gate 92 to which are applied the last input and the output of the preceding exclusive-OR gate. The output of gate 92 at terminal 93 comprises the final output of the adder network.

It is to be understood that many other circuit arrangements are known which perform the exclusive-OR function of the circuit of FIG. 4A as well as the modulo-2 addition function of the circuit of FIG. 4B. These circuits are only intended to be illustrative and in no way limit the invention to these particular forms.

Returning to FIG. 3A, it can be seen that the feedback connections from leads 72 through 75 to adder circuits 64 through 67 are arranged to implement the iteration process of Equations 20. For example, the $y_1(n)$ output at lead 72 is connected to adder 65 and combined with the $y_4(n)$ output at lead 75 and the $x_2(n+1)$ input at lead 61 to form the next output $y_2(n+1)$ which, after a one interdigital delay period, appears at the output lead 73. Each of the other outputs is generated in a similar and obvious fashion.

Figure 3B:
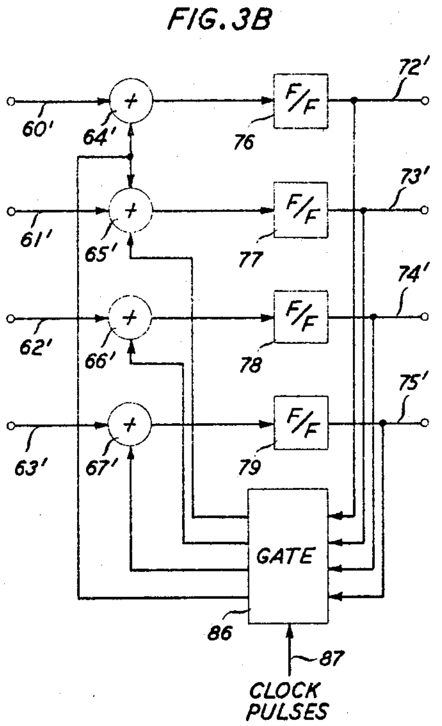

In FIG. 3B there is shown an alternative arrangement of a linear sequential network for nonsynchronous parallel digit inputs. In the arrangement of FIG. 3A, it is assumed that the digits all arrive at leads 60 through 63 in exact synchronism and that delay elements 68 through 71 have exactly the same delay which is exactly equal to the period between successive input digits. In many cases, these assumptions are difficult to realize. In the arrangement of FIG. 3B, the timing requirements are not as stringent.

The linear sequential network of FIG. 3B comprises a plurality of input leads 60' through 63' connected as in FIG. 3A to respective ones of a plurality of modulo-2 adder circuits 64' through 67'. Instead of delay line interdigital storage elements, however, the circuit of FIG. 3B utilizes bistable multivibrators or flip-flops of the type well known in the art which remain in either one of two stable states until triggered to the other state by the application of an appropriate input signal. Such circuits can be realized with transistors, vacuum tubes, and many other circuit elements.

The feedback lines from output leads 72' through 75' are introduced into a gate circuit 86 to which there is applied clock pulses on lead 87. The outputs of gate 86 are applied to the adders 64' through 67' in exactly the same manner as the feedback lines in FIG. 3A. If the bistable circuits 76 through 79 operate very rapidly, it may be necessary to insert a small amount of delay in the feedback lines to prevent multiple triggering of the bistable circuits during a single clock pulse. A double rank shift register (two stages for each digit) could also be used to insure single triggering during each clock pulse.

The circuits of FIGS. 3A and 3B are advantageous when the information symbols are transmitted in parallel. Multifrequency code bursts, for example, provide all digits simultaneously. In some cases, however, it is more advantageous to transmit the digits serially over a single medium. When this type of serial transmission is used, the linear sequential networks of FIGS. 5A and 5B could be used.

Figure 5A:
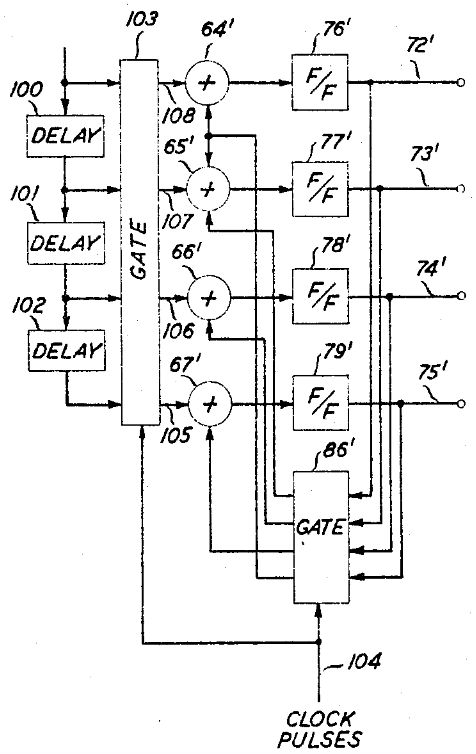
FIGS. 5A and 5B are alternative arrangements of certain portions of FIGS. 1 and 2 for serial information processing.

Referring more particularly to FIG. 5A, there is shown a series-to-parallel translator comprising three delay lines 100, 101 and 102, each providing a delay equal to one pulse period. The outputs of delay lines 100 through 102 are applied to a gate circuit 103 which is operated by clock pulses on lead 104. Clock pulses are applied to lead 104 once for every serial word applied to delay lines 100 to 102 and timed to occur as the fourth digit in a word appears at the input of delay line 100. Thus the output of gate 103 is the same word as applied serially to delay line 100 but appearing in parallel form on leads 105 through 108. The remainder of the circuit of FIG. 5A is identical to FIG. 3B and has been indicated by the same reference numerals. This circuit, of course, operates in exactly the same fashion as the circuit of FIG. 3B providing an output in parallel on output leads 72' through 75'.

The circuit arrangement for the linear sequential network 33 in FIG. 2 would be similar in form to FIG. 5A, the feedback connections, of course, being arranged so as to effect the $A^2$ operation. The $A^{-1}$ and $A^{-2}$ operations would then be performed in parallel as before. In order to return the information to the serial form at the output of the error correcting circuit, a parallel-to-series converter of the form shown in FIG. 5B might be used.

Figure 5B:
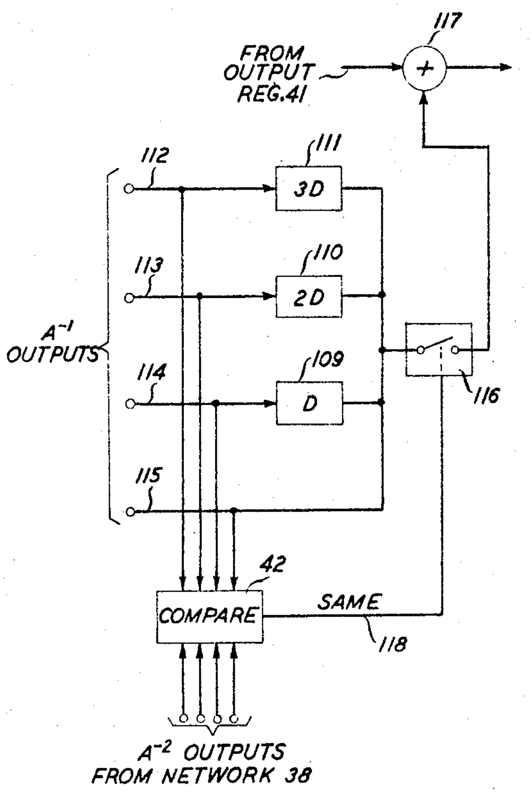

The circuit of FIG. 5B comprises a parallel-to-series converter including delay lines 109, 110 and 111 having delays equal to, twice, and three times, respectively, the interdigital period of the serial pulse train. There is applied to input leads 112, 113, 114 and 115 the output of a linear sequential network performing the operation $A^{-1}$ and identified by the reference numeral 37 in FIG. 2.

The outputs of delay lines 109, 110, 111 and input lead 115 are connected together and applied to a slow release gating circuit 116. The output of gate 116 is applied to a modulo-2 adder circuit 117 to which there is also applied the output of shift register 41 in FIG. 1.

The word appearing in parallel on leads 112 through 115 is also applied to compare circuit 42 to which there is also applied the output word from linear sequential network 38 in FIG. 2. As before, compare circuit 42 produces an output on lead 118 when the two input words are identical and operates slow release gate 116. Gate 116, of course, holds closed at least for the duration of the entire serial word from delay lines 109, 110 and 111. Adder 117 serves to add the correction to the output of register 41.

In many cases it may be desirable to reduce the probability of errors by more or less frequent error correction. In a long transmission system, for example, it may be more desirable to correct errors at each repeater location rather than accumulate errors over the entire transmission line and attempt to correct them in a single operation. In such a system, it is desirable not only to correct errors in each block of information, but also to regenerate the check symbols so as to permit the correction of future errors at the next repeater station on the transmission line. This technique reduces the complexity of the error correcting equipment since multiple errors are far less likely to occur over the shorter transmission link. Even more importantly, the amount of redundancy which must be introduced into the transmitted signal for error correction purposes is far less when only single errors need be corrected.

Figure 6:
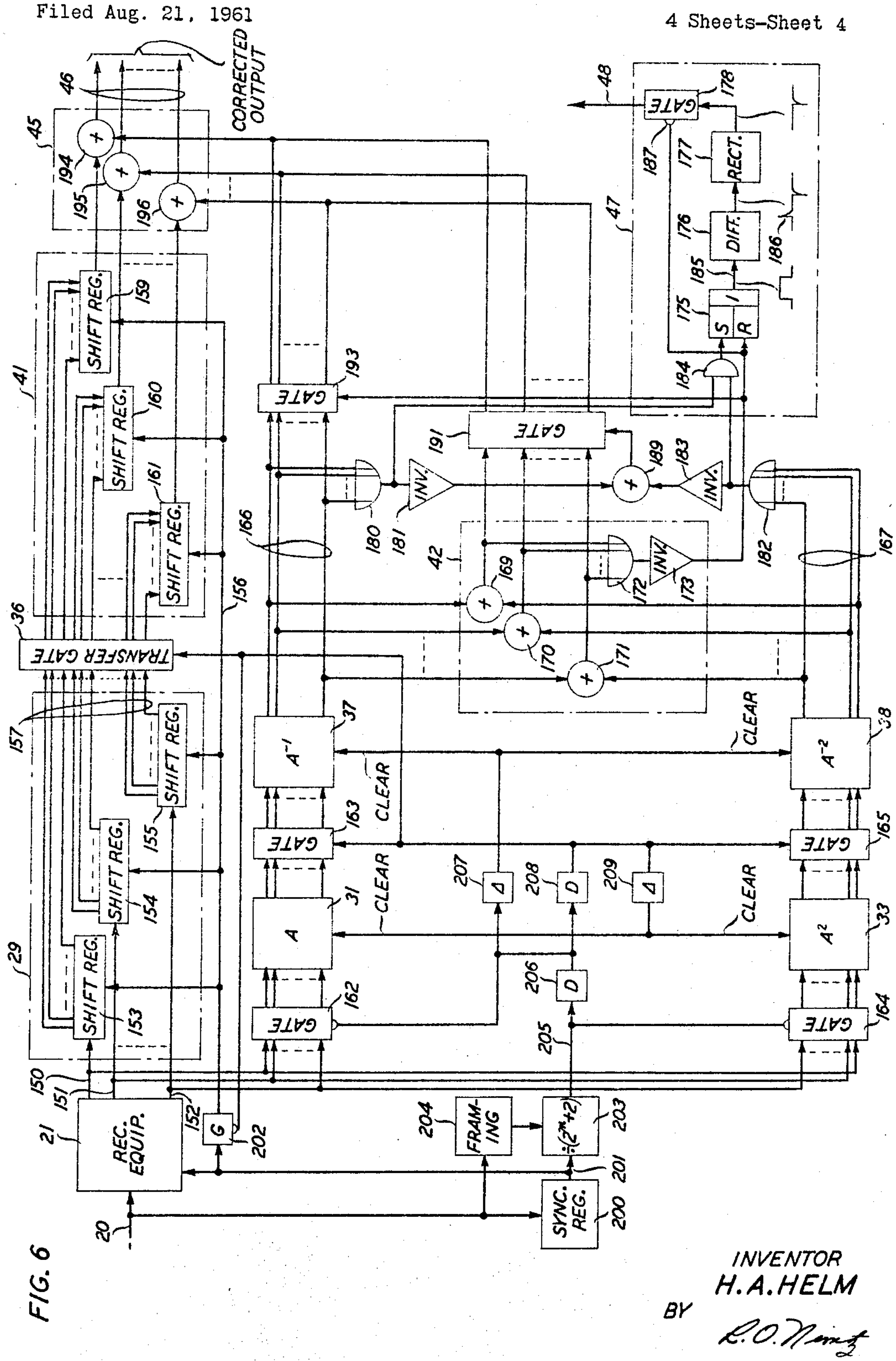
FIG. 6 is a more detailed schematic block diagram of a specific error correcting circuit which detects and corrects errors in the check symbols as well as in the information symbols.

The circuit of FIG. 6 shows an error correcting circuit similar to that shown in FIG. 2 but including means for correcting and retransmitting the check characters as well as the information characters. The circuit of FIG. 6 is somewhat more detailed than FIG. 2 and assumes that the information and check characters are, or can easily be made, available in parallel form.

Turning then to FIG. 6, the message blocks are received on medium 20 with the digits of each word appearing simultaneously. Medium 20 may comprise physically separate facilities for each digit of the words or may comprise a single facility on which the digits are imposed by frequency multiplexing techniques. Receiving equipment 21 detects, amplifies and regenerates, as required, the signals on medium 20 so as to present each word in parallel form on output leads 150, 151 . . . 152.

The successive digits on lead 150 are pulsed into shift register 153 by the synchronous application of advance pulses on lead 156. Similarly, the digits on lead 151 are shifted into shift register 154 and the digits on lead 152 are shifted into shift register 155. The number of leads 150 through 152 and shift registers 153 through 155 will, of course, coincide with the number of digits ($m$) in each word. Each stage of shift registers 153, 154 and 155 is connected by way of leads 157 to a transfer gate 36, the outputs of which are connected to corresponding stages of shift registers 159, 160 and 161. The operation of transfer gate 36 serves to transfer in parallel the contents of shift registers 153, 154 and 155 to registers 159, 160 and 161, respectively. The order of the words is reversed, however, so that the last word shifted into each of registers 153 through 155 will be the first word shifted out of corresponding ones of registers 159 through 161. Advance pulses from lead 156 are also applied to shift registers 159, 160 and 161.

The output of receiving equipment 21 appearing in parallel on leads 150 through 152 is also applied through an inhibit gate 162 to a linear sequential network 31 which performs the operation A as in FIG. 2. The output of network 31 is applied to a gate 163 which when operated transfers the output of network 31 to the input of linear sequential network 37. Gate 163, therefore, corresponds to the upper contact of gate 35 in FIG. 2.

The output of receiving equipment 21 appearing on leads 150 through 152 is also applied to an inhibit gate 164 and thence to linear sequential network 33. The output of network 33 is applied through gate 165 to linear sequential network 38. Gate 165, of course, corresponds to the lower contact of gate 35 in FIG. 2.

The output of network 37 appearing on leads 166 and the output of network 38 appearing on leads 167 are applied to a compare circuit or coincidence detector 42. Comparator 42 comprises a plurality of two-input exclusive OR circuits 169, 170 . . . 171, a single $m$-input OR gate 172, and an inverter circuit 173. It can be seen that inverter 173 will produce an output only when none of the input leads to OR gate 172 are energized. Each input of OR gate 172, in turn, will be energized only if the corresponding one of gates 169 through 171 is enabled. Corresponding ones of digit leads 166 and 167 are applied to corresponding ones of exclusive OR gates 169 through 171. Hence each of these exclusive OR gates will be energized only when the corresponding digits on leads 166 and 167 are different. From the above description, it can be seen that an output will appear from inverter 173 only when all of the digits on leads 166 are identical to the corresponding digits on leads 167. The output of inverter 173 is applied to gate 193 to connect the output on lead 166 to adder circuit 45.

The output of compare circuit 42 is applied to delayed pulse generator 47. Delayed pulse generator 47 comprises a monostable multivibrator circuit 175, a differentiator circuit 176, a half-wave rectifier 177 and an inhibit gate 178, all connected in series.

The output of network 37 appearing on leads 166 is applied to a logical OR gate 180 which delivers an output to inverter 181 whenever the word on leads 166 includes at least a single "1." Similarly, a logical OR gate 182 is connected to leads 167 and delivers an output to inverter 183 when any code but the all-zeros code appears on output leads 167. The outputs of OR gates 180 and 182 are also connected to logical AND gate 184, the output of which is used to trigger monostable multivibrator 175 in delayed pulse generator 47. It can thus be seen that monostable multivibrator 175 will be triggered if the codes appearing on output leads 166 and output leads 167 both include at least a single "1." (Neither is an all-zeros code.)

Monostable multivibrator 175 is of the type well known in the art which produces an output on lead 185 of preselected duration in response to the application of a triggering pulse from AND gate 184. Monostable multivibrator 175 also includes a reset input to which pulses from inverter 173 are applied. Pulses from inverter 173 can be used to reset monostable multivibrator 175 to its quiescent state at any time prior to the termination of its normal output pulse.

Differentiating circuit 176 differentiates the output pulse from circuit 175 to form positive and negative pips, as shown in waveform 186, from the leading and trailing edges, respectively, of the output of circuit 175. Rectifier 177 is poled to pass only negative pulses and hence removes the positive pulse generated from the leading edge of the output of circuit 175. Gate circuit 178 is of the type that is normally closed but which can be disabled by the application of a signal to inhibit input 187. The output from inverter 173 is applied to inhibit input 187 to inhibit the output on lead 48 whenever monostable multivibrator 175 is prematurely reset by a pulse from inverter 173.

The output of inverter 181 and the output of inverter 183 are applied to a modulo-2 adder 189. The output of adder 189 is applied to enable a gate 191 connecting the outputs of exclusive-OR circuits 169 through 171 to a plurality of exclusive-OR circuits 194, 195 . . . 196 in adder circuit 45.

The timing control circuitry is shown in FIG. 6 in greater detail than FIG. 2 and comprises a sync recovery circuit 200 which utilizes the incoming message pulse trains on medium 20 to generate a train of timing pulses on lead 201 corresponding to the time of arrival of each word at receiving equipment 21. These timing pulses are used to regenerate the received words in receiving equipment 21 and are also applied via inhibit gate 202 to advance lead 156 to advance the digits in input shift registers 153, 154 . . . 155 and output shift registers 159, 160 . . . 161.

The output of sync recovery circuit 200 appearing on lead 201 is also applied to a divider circuit 203 which divides the pulse train applied to it by a factor $(2^m+2)$. Assuming that there are $(2^m-1)$ information symbols, two check symbols and a guard space of a single symbol's duration, the length of each message block is equal to $(2^m+2)$ symbol periods. Divider circuit 203 divides the pulse train on leads 201 by this factor and produces an output pulse on lead 205, once for each message block received from medium 20.

Framing circuit 204 recognizes each message block, advantageously by means of the regularly recurrent appearance of the guard space, and uses this information to frame divider circuit 203 such that the output pulses appearing on lead 205 coincide with the appearance of the check symbol $Y_1$ at receiving equipment 21. This signal on lead 205 is therefore used to inhibit gate 164 so as to prevent the passage of check symbol $Y_1$ to network 33. An intersymbol delay network 206 delays the pulse on lead 205 for one pulse period until the appearance of the check symbol $Y_2$ at receiving equipment 21. The output of delay network 206 is used to inhibit gate 162 to prevent the passage of check symbol $Y_2$ to network 31.

The output of delay line 206 is further delayed a fraction of the intersymbol period in delay line 207 and is utilized to clear networks 37 and 38 of the results of the previous inverse operations.

The output of delay line 206 is also applied to a second intersymbol delay network 208 which delays this pulse one more intersymbol period so that it falls in the guard space between successive message blocks. This pulse is applied to transfer gate 36 to transfer the contents of input shift registers 153, 154 . . . 155 to output shift registers 159, 160 . . . 161 and is simultaneously applied to gate 202 to inhibit the application of advance pulses to the shift registers during the transfer operation. At the same time, the output of delay line 208 is applied to gates 163 and 165 to transfer the outputs of networks 31 and 33 to the inputs of networks 37 and 38, respectively. After a delay of a fraction of the intersymbol period in delay network 209, the output of delay line 208 is also used to clear networks 31 and 33, respectively, in preparation for the arrival of the next message block.

In order to preserve the check characters, the circuit of FIG. 6 is arranged to shift the check characters as well as the information characters into shift registers 153 through 155. Output shift registers 159 through 161 also include the added storage capacity for storing the check characters. Correction of the check characters takes place in a fashion similar to the correction of the information characters as follows:

It can be easily seen from Equations 7 and 8 that if all of the information characters are correct and one of the check characters is in error, the output of network 31 after the final iterative sequential operation will be zero, if $Y_1'$ is received correctly, or will be equal to N, the amount of the error, if $Y_1'$ is in error. Similarly, the output of network 33 will be zero if $Y_2'$ is correct and will be equal to N if $Y_2'$ is in error. The operation of gates 163 and 165 transfers these outputs from networks 31 and 33 to networks 37 and 38, respectively. The first inverse operation does not affect these outputs (because the previous outputs of networks 37 and 38 were cleared to zeros) but transfers them unaffected to their own outputs until the next inverse sequencial operation can take place. Thus the first output from networks 37 and 38 can be used to ascertain the fact that a check character is in error.

An output from inverter 181 indicates that an all-zeros code appears on leads 166. Similarly, an output from inverter 183 indicates that an all-zeros code appears on output leads 167. The output of exclusive–OR circuit 189 indicates that an all-zeros code appears on one, and only one, of output leads 166 and 167. This output is used to operate gate 191 which applies the outputs of exclusive-OR circuits 169 through 171 to exclusive-OR circuits 194 through 196, thus correcting the error in the check symbols which, of course, are the first words read out of output shift registers 159 through 161.

The output of the circuit of FIG. 6 appearing on leads 46 will be a reverse order with respect to the input message block will have any single errors in an information symbol or a check symbol corrected. If more than a single error occurs, an output will appear on lead 48 which can be used to request retransmission of the block including the mutiple errors or simply used to mark the erroneous block as unusable.

It will be noted that it is not necessary to reinvert the order of the symbols leaving the error correcting circuit of FIG. 6. This can be easily seen by examining Equations 3 or 4. In the modulo-2 notation, any one of the characters is a representation of the modulo-2 sum of the remaining characters, provided only that the check characters $Y_1$ and $Y_2$ are computed as described. At the next error correction station following that of FIG. 6, the identical circuitry can be used to correct single errors appearing anywhere in the block using the last two characters to arrive as check characters. Ultimately, of course, when it is desired to use the information characters, it will be necessary to know how many successive inversions took place so that the check characters can be discarded and only the proper information characters used.

It should be further noted that multiple errors can be corrected at a single error correcting station merely by transmitting message blocks in an interlaced form instead of successively. A synchronized distributor could then deliver the characters from each of the interlaced blocks to a separate circuit similar to that of FIG. 6. In this way, burst errors overlapping two or more adjacent characters could be corrected, as well as multiple errors with any other spacing.

The error correcting circuits of the present invention are therefore extremely adaptable and, since they include relatively simple arrangements of gates and storage elements, are very economical to build and very reliable once in use.

It is to be understood that the above described arrangements are merely illustrative of the numerous and varied other arrangements which may constitute applications of the principles of the invention. Such other arrangements may readily be devised by those skilled in the art without departing from the spirit and the scope of the invention.

What is claimed is:

1. Data processing apparatus comprising a source of digital information, means for dividing said digital information into blocks of digital characters, each of said characters including the same number of digits, a first linear sequential circuit including means for performing a first iterative operation on a sequence of multidigit information characters, a second linear sequential circuit including means for performing a second iterative operation on a sequence of multidigit information characters, means for successively applying the characters of said blocks of information characters to said first and second linear sequential circuits, and means for associating each said block of information characters with the corresponding outputs of said first and second linear sequential circuits.

2. Apparatus for correcting errors in a block of digital characters including a plurality of information characters and at least two check characters, said apparatus comprising first register means for sequentially registering said information characters, at least first and second linear sequential iterative circuits for arithmetically operating on all of said characters, second register means, means for simultaneously transferring all of said information characters from said first register means to said second register means, means for sequentially reading said information characters from said second register means in reverse order, at least third and fourth linear sequential iterative circuits for performing inverse arithmetic operations on the outputs of said first and second circuits, respectively, means for comparing the outputs of said third and fourth circuits to ascertain identical outputs, and means responsive to said identical outputs for modifying one of said information characters in accordance with one of said identical outputs.

3. In combination, a source of multidigit information characters, first and second linear sequential networks, each said first and second networks including means for linearly operating upon and iteratively combining said information characters to form first and second check characters, means for associating said first and second check charcters with the corresponding information characters, third and fourth linear sequential networks for repeating the operation of said first and second networks on said information characters and said check characters, fifth and sixth linear sequential networks, each said fifth and sixth networks including means for inversely operating upon the outputs of said third and fourth networks, and means responsive to the outputs of said fifth and sixth networks for correcting errors in any symbol in the associated information characters.

4. The combination according to claim 3 wherein each said linear sequential networks includes means for storing each digit of each character until the corresponding digits of the next succeeding characters are available, and modulo-$p$ adding circuits for combining the output digits from said storing means with the digits of successively available characters, where $p$ is the radix of said digital characters.

5. The combination according to claim 3 wherein said linear operating means comprise means for translating each character of the entire class of possible non-zero characters into a unique one other character of said class.

6. The combination according to claim 3 including a plurality of parallel digit leads, and means for simultaneously supplying the digits of each information character to said digit leads.

7. The combination according to claim 3 including a single character lead, and means for successively supplying the digits of each information character to said character lead.

8. An error detecting check code generator comprising a source of digital message signals, means for dividing said digital message signals into blocks of equidigit characters separated by a guard space of at least two characters' duration, a first linear sequential network including means for translating each digital character into a unique first other character, and means for iteratively combining the output of said first network with successively applied inputs to said first network, a second linear sequential network including means for translating each digital character into a unique second other digital character different from the corresponding first unique other character, and means for iteratively combining the output of said second network with successively applied inputs to said second network, means for successively applying all of the characters of each of said blocks to said first and second linear sequential networks, and means for inserting in said guard space the outputs from said first and second networks after all of the characters of said block have been iteratively combined.

9. The check code generator according to claim 8 wherein said linear sequential networks each comprise means for storing the digits of a character until the digits of the next succeeding character are applied, adding means for adding the output of said storing means to said next succeeding character, and means connecting the output of said adding means to the input of said storing means.

10. The check code generator according to claim 9 including a plurality of digit leads, and means for simultaneously applying the digits of each said character to said digit leads.

11. The check code generator according to claim 9 including a character lead, and means for successively applying the digits of each said character to said character lead.

12. Error checking apparatus for digital information appearing in blocks of equidigit characters including a plurality of information characters and at least two check characters, said apparatus comprising first digital storage means, means for registering said information characters in said storage means, a first linear sequential network including means for translating each digital character into a unique first other digital character, and means for iteratively combining the output of said first network with successively applied inputs to said first network, a second linear sequential network including means for translating each digital character into a unique second other digital character different from the corresponding first unique other character, and means for iteratively combining the output of said second network with successively applied inputs to said second network, means for successively applying said information and check characters to said first and second linear sequential networks, second digital storage means, means for substantially simultaneously transferring the information characters registered in said first storage means to said second storage means, means for successively reading said information characters from said second storage mean in invere order to the order stored in said first storage means, a third linear sequential network for performing the inverse of the iterative operation performed by said first network, means for applying the output of said first network after an entire block has been iteratively combined to said third network, a fourth linear sequential network for performing the inverse of the iterative operation performed by said second network, means for applying the output of said second network after an entire block has been iteratively combined to said fourth network, means for comparing the outputs of said third and fourth networks to ascertain identities, and means for combining the output of said third network when an identity occurs to the output of said second storage means.

13. The error checking apparatus according to claim 12 further including means for detecting unequal non-zero outputs from said first and second linear sequential networks, means responsive to said detecting means for generating a delayed error indicating signal, and means responsive to said identity for canceling said delayed error indicating signal.

14. The error checking apparatus according to claim 12 wherein said linear sequential networks each comprise means for registering the digits of each character until the digits of the next succeeding character are applied, adding means for adding the output of said registering means to said next succeeding character, and means connecting the output of said adding means to the input of said registering means.

15. Error detecting and correcting apparatus comprising a source of digital information characters, means for iteratively combining said information characters to form checking characters, means for transmitting said information and check characters through a noisy medium, means for iteratively combining said transmitted information and check characters to form error characters, means for inversely iteratively operating on said error characters, and means responsive to said inverse iterative operations to correct errors in said transmitted information characters.

16. The error detecting and correcting apparatus according to claim 15 further including error indicating means, and means for enabling said indicating means in response to non-zero error characters and in the absence of error correction.

17. Data processing apparatus for blocks of $(p^m-1)$ digitally represented information symbols, where $p$ is the radix of the digital number system and $m$ is the number of digits in each symbol, said apparatus comprising means for generating check symbols $Y_1$ and $Y_2$ according to the iterative formulae $$Y_1=\sum_{i=1}^{i=p^m-1} A^{(i-1)}X_i \text{ and } Y_2=\sum_{i=1}^{i=p^m-1} A^{2(i-1)}X_i$$

where the X's comprise said information symbols and A is a linear sequential operation, means for subjecting said information and check symbols to an error-causing operation, means for generating error symbols $E_1$ and $E_2$ according to the iterative formulae $$E_1=Y_1'+\sum_{i=1}^{i=p^m-1} A^{(i-1)}X_i' \text{ and } E_2=Y_2'+\sum_{i=1}^{i=p^m-1} A^{2(i-1)}X_i'$$

where the primes represent the information and check symbols after said error-causing operation, means for generating correction symbols $Z_1$ and $Z_2$ according to the iterative formulae $$[Z_1(n+1)=A^{-1}Z_1(n) \text{ and } Z_2(n+1) = A^{-2}Z_2(n)]_{n=1,2,3,\ldots p^m-1}$$

where $Z_1(0)$ equals $E_1$ and $Z_2(0)$ equals $E_2$, means for comparing each successively generated pair of correction symbols to ascertain equalities and means responsive to said comparing means for correcting errors in said information symbols.

18. The data processing apparatus according to claim 17 further including means for generating a multiple error signal, said error signal generating means comprising first detecting means for detecting $E_1 \neq 0$, $E_2 \neq 0$, second detecting means for detecting $Z_1(n) \neq Z_2(n)$ for any value of $n$, and means responsive to both said first and second detecting means for producing an error signal.

19. The data processing apparatus according to claim 17 further including means for storing all of said information signals until said error symbols have been generated, means for reading said information symbols from said storing means in reverse order and in synchronism with the generation of said correction symbols, and means for adding one of said equal correction symbols to the information symbol read from said storing means in synchronism with the generation of said equal correction symbols.

20. The data processing apparatus according to claim 17 wherein said radix is two and wherein all of said generating means includes inter-symbol storage elements and exclusive-OR logic circuits.

21. The data processing apparatus according to claim 17 wherein the operation A is represented by a matrix of the form $$A=\begin{bmatrix} 0 & 0 & 0 & \cdots & 0 & a_0 \\ 1 & 0 & 0 & \cdots & 0 & a_1 \\ 0 & 1 & 0 & \cdots & 0 & a_2 \\ \vdots & & & & \vdots & \vdots \\ 0 & 0 & 0 & & 1 & a_{m-1} \end{bmatrix}$$

where the $a_i$'s are the binary coefficients of an irreducible non-zero prime factor polynomial of $x^{2^m}-x=0$.

22. Error detecting and correcting apparatus comprising a source of digital information characters, means for iteratively combining said information characters to form checking characters, means for transmitting said information and check characters through a noisy medium, means for iteratively combining said transmitted information and check characters to form error characters, means for inversely iteratively operating on said error characters, means responsive to said inverse iterative operations to correct errors in said transmitted information characters, said iterative combining means comprising means for performing iterative arithmetic operations of the form $$Y(n+1)=X(n+1)+AY(n)$$

where X represents successive multidigit input characters, Y represents successive multidigit output characters, A is an arithmetic operator expressible as a matrix having arithmetic significance with respect to said characters, and $n$ is the number of the input characters, a plurality of storage means equal in number to said number of digits, adding means equal in number to the number of said digits, means connecting the outputs of said adding means to corresponding inputs of said storage means, means for applying the digits of said X characters to corresponding ones of said adding means, means for deriving the digits of said Y characters from the outputs of said storage means, and means for implementing said matrix operation comprising feedback means for selectively feeding said outputs of said storage elements to said adding means in accordance with the entries in said matrix.

23. The combination according to claim 22 wherein said feedback means comprises a feedback lead from each output of said storage means corresponding to each non-zero entry in said matrix, each of said feedback lead extending from the one of said storage means outputs corresponding to the column of said non-zero entry to the one of said adding means corresponding to the row of said non-zero entry.

24. Error detecting and correcting apparatus comprising a source of digital information characters, means for iteratively combining said information characters to form checking characters, means for transmitting said information and check characters through a noisy medium, means for iteratively combining said transmitted information and check characters to form error characters, means for inversely iteratively operating on said error characters, means responsive to said inverse iterative operations to correct errors in said transmitted information characters, said iterative combining means comprising circuit means for implementing iterative matrix-represented operations on digital symbols, said matrix representation comprising an array of rows and columns of digital entries characterizing the digit-by-digit elements of said iterative operation, which circuit means comprises a source of said digital symbols, a combining circuit corresponding to each digit of said symbols and to the rows of said array, intersymbol delay means connected to the output of each of said combining circuits, the outputs of said delay means corresponding to the columns of said array, and feedback means for each non-zero entry in said array connecting that output of said delay means corresponding to the column of said array in which said non-zero entry appears to that combining circuit corresponding to the row of said array in which said non-zero entry appears.

References Cited by the Examiner

UNITED STATES PATENTS

| | | | |
|---|---|---|---|
| 2,956,124 | 10/1960 | Hagelbarger | 340—146.1 |
| 2,977,047 | 3/1961 | Blich | 235—153 |
| 3,009,638 | 11/1961 | Merz et al. | 235—152 |
| 3,037,697 | 6/1962 | Kahn | 235—153 |
| 3,039,688 | 6/1962 | Moe et al. | 235—152 |
| 3,069,657 | 12/1962 | Green et al. | 340—171 |
| 3,114,130 | 12/1963 | Abramson | 340—146.1 |

MALCOLM A. MORRISON, *Primary Examiner.*

M. J. SPIVAK, M. P. HARTMAN, *Assistant Examiners.*